United States Patent [19]

Sugimoto

[11] Patent Number: 5,865,276
[45] Date of Patent: Feb. 2, 1999

[54] CANTILEVER BRAKE DEVICE

[75] Inventor: Masanori Sugimoto, Osakasayama, Japan

[73] Assignee: Shimano, Inc., Osaka, Japan

[21] Appl. No.: 801,746

[22] Filed: Feb. 18, 1997

[30] Foreign Application Priority Data

Feb. 20, 1996 [JP] Japan .................................. 8-031622

[51] Int. Cl.[6] ............................................... B62L 1/14
[52] U.S. Cl. ...................... 188/24.21; 188/24.12
[58] Field of Search ........................... 188/24.11, 24.12, 188/24.19, 24.21, 24.22, 20

[56] References Cited

U.S. PATENT DOCUMENTS

| | | | |
|---|---|---|---|
| 4,754,853 | 7/1988 | Nagano | 188/24.19 |
| 5,123,295 | 6/1992 | Lo | 188/24.12 |
| 5,293,965 | 3/1994 | Nagano | 188/24.21 |
| 5,469,934 | 11/1995 | Chen | 188/24.21 |

FOREIGN PATENT DOCUMENTS

| | | | |
|---|---|---|---|
| 0 432 268 A1 | 6/1991 | European Pat. Off. | B62L 1/14 |
| 0 554 909 A1 | 8/1993 | European Pat. Off. | B62L 1/14 |
| 658 473 | 6/1995 | European Pat. Off. | |
| 5-37674 | 5/1993 | Japan | B62L 1/14 |

*Primary Examiner*—Matthew C. Graham
*Attorney, Agent, or Firm*—James A. Deland

[57] ABSTRACT

A cantilever brake arm apparatus includes a brake link having a basal end structured for rotatably supporting the brake link on a bicycle, an intermediate section structured for supporting a brake shoe, and a distal end. A coil spring has a first end retained to the basal end of the brake link, and the second end of the coil spring is retained in a spring position adjusting member that is rotatably supported relative to the basal end of the brake link. The second end of the coil spring extends beyond the spring position adjusting member so that the second end of the coil spring may be inserted into a selected opening in the mounting pedestal.

18 Claims, 10 Drawing Sheets

CANTILEVER BRAKE DEVICE

BACKGROUND OF THE INVENTION

The present invention is directed to cantilever bicycle brake devices.

Bicycles capable of off-road travel, such as MTBs (mountain bikes) are equipped with cantilever brake devices in order to provide strong braking force. Cantilever brake devices straddle both sides of the bicycle rim to provide braking action, and are generally equipped with a pair of left and right brake links, brake shoes attached to the brake links, and coil springs which energize the brake links towards the brake release position. The brake links are rotatably supported in cantilever fashion by mounting pins that project from pedestals provided to the front fork or rear fork (seat stay) of the bicycle. Each coil spring is disposed within the rotatably supported member of a brake link, with one end of the spring protruding the rotatably supported member and engaged by any one of three engagement holes provided to the pedestal. These three engagement holes are disposed at positions located an equal radius from the center of the mounting pin. By changing the position at which the coil spring is engaged by the pedestal, the spring power (force towards the brake release position) can be varied between three levels.

With the conventional cantilever brake device described above, inserting the coil spring into an engagement hole presents no particular problem when it is possible to rotate the brake link in order to place the one end of the coil spring at a position such that it can be engaged by the engagement hole. However, when changing the spring force or mounting the brakes, where the wheel interferes with the brake shoes so that the brake links cannot be rotated inward very far, where the fork interferes with the brake shoes so that the brake links cannot be rotated outward very far, and in similar cases where rotation by the brake links is restricted, it is sometimes not possible to readily position the end of the coil spring within the coil spring with needle-nose pliers or a similar tool, or to perform some similar complicated procedure in order to position the spring end within the desired engagement hole. Thus, the end of the coil spring can not be easily positioned within the engagement hole.

SUMMARY OF THE INVENTION

The present invention is directed to a cantilever brake device wherein the end of the coil spring can be easily inserted into a desired opening in the mounting pedestal even when rotation of the brake links is restricted. In one embodiment of the present invention, a cantilever brake arm apparatus includes a brake link having a basal end structured for supporting a brake shoe, and a distal end. A coil spring has a first end retained to the basal end of the brake link, and the second end of the coil spring is retained in a spring position adjusting member that is rotatably supported relative to the basal end of the brake link. The second end of the coil spring extends beyond the spring position adjusting member so that the pedestal. In a more specific embodiment, the spring position adjusting member includes a cylindrical section having a bottom surface, wherein an opening is disposed in the bottom surface for receiving the second end of the coil spring therethrough. A triangular rotation control member may extend radially outwardly from the cylindrical section to facilitate bicycle.

DETAILED DESCRIPTION OF THE EMBODIMENTS

Figure 1:
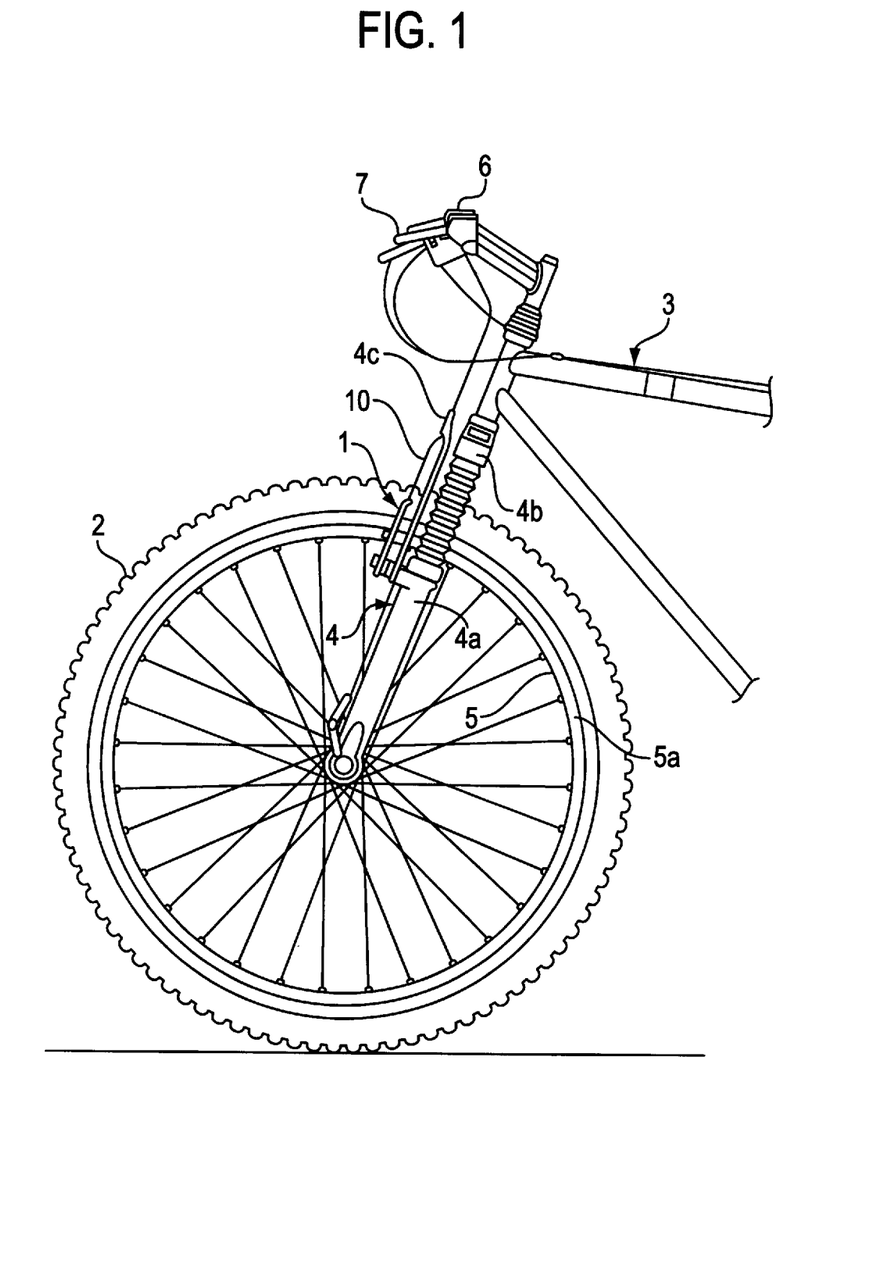
FIG. 1 is a partial side view of a bicycle which incorporates a particular embodiment of a cantilever brake device according to the present invention.
Figure 2:
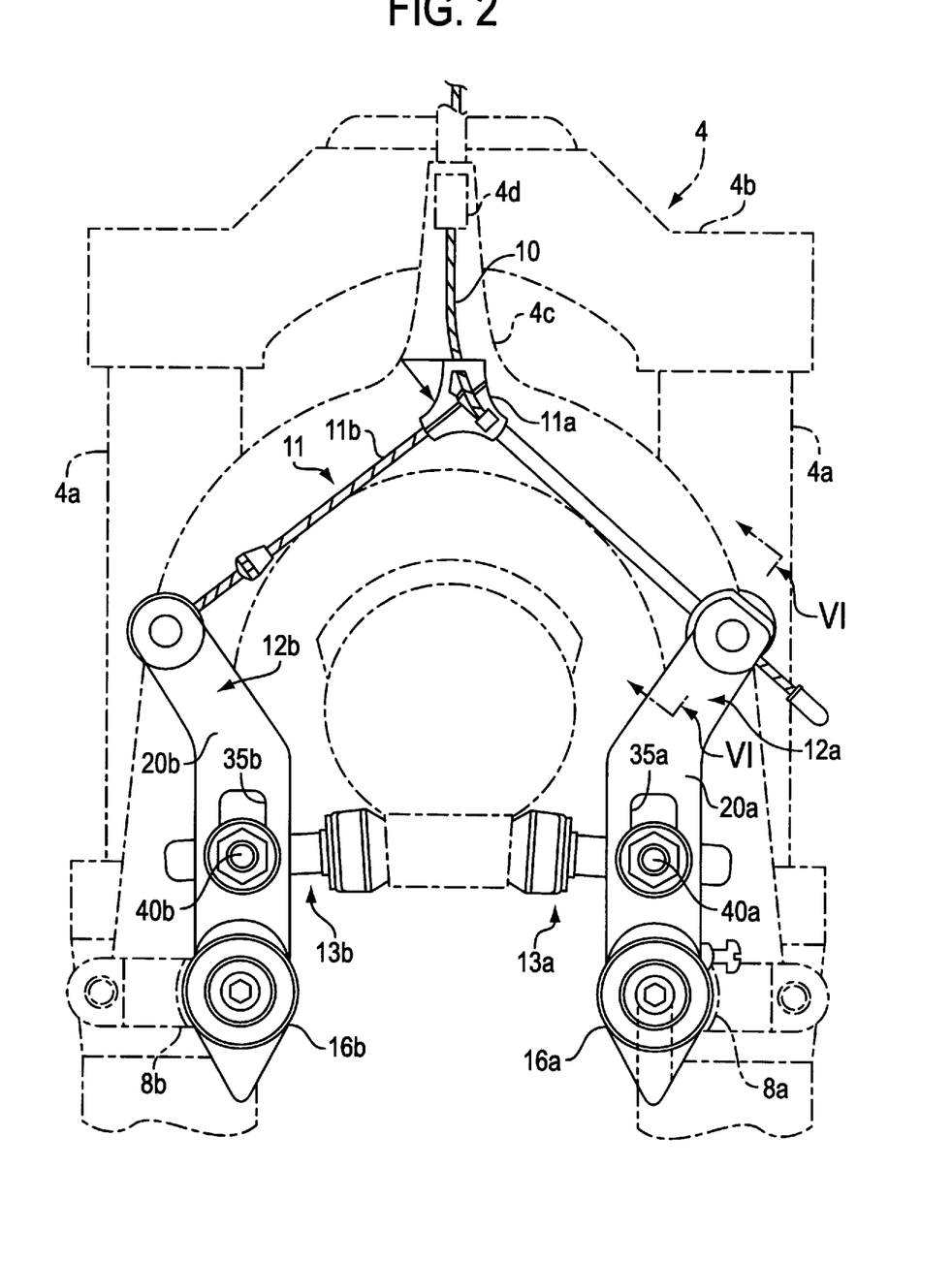
FIG. 2 is a front view of a particular embodiment of a cantilever brake device according to the present invention.

A cantilever brake device 1 pertaining to one embodiment of the present invention, for example, a device for front wheel use, is illustrated in FIGS. 1 and 2. The brake device 1 is rotatably supported on the front fork 4 of the frame 3. The front fork 4 comprises, for example, an air/oil system or elastomer system suspension fork capable of absorbing shock members 4a, mounting members 4b for mounting the pair of suspension members 4a, and a stabilizer 4c for reinforcing the suspension members 4a. The stabilizer 4c is essentially of an inverted U-shape which splits into two arms. Its bottom ends are affixed at points midway down the suspension members 4a, and the top end is equipped with a cable stay 4d that retains the outer casing cable component.

Figure 5:
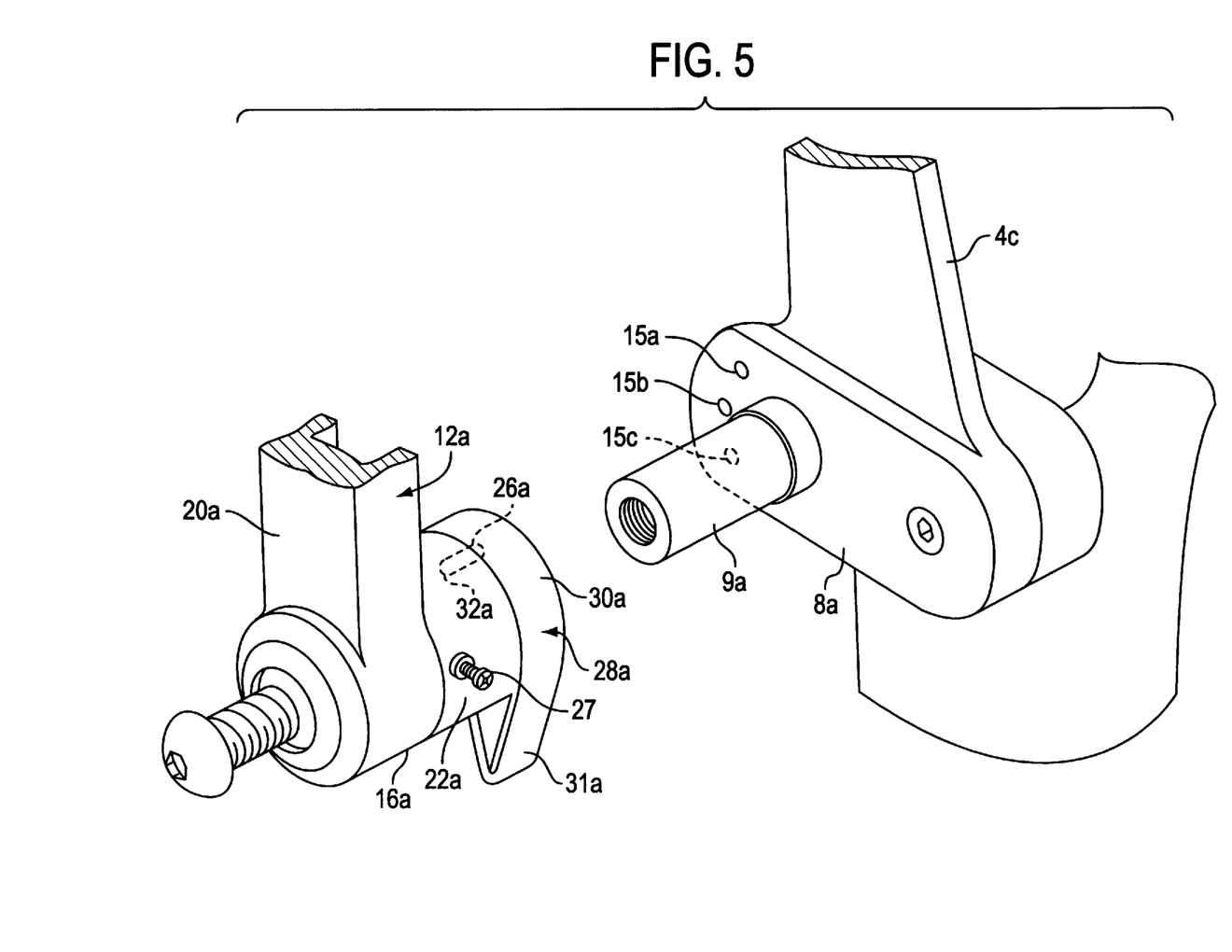
FIG. 5 is a partially exploded view of the lower portion of the brake link assembly shown in FIG. 4.

A pair of left and right pedestals 8a and 8b are disposed at the bottom ends of the stabilizer 4c. As shown in FIG. 5, stepped mounting pins 9a and 9b (only 9a is shown) project forward from the pedestals 8a and 8b. Three engagement holes 15a, 15b, and 15c are made on each pedestal 8a and 8b, and they are disposed on a circle which is centered on the mounting pin 9a (9b) in order to engage a coil spring (described later) which is provided to the brake device 1.

Figure 3:
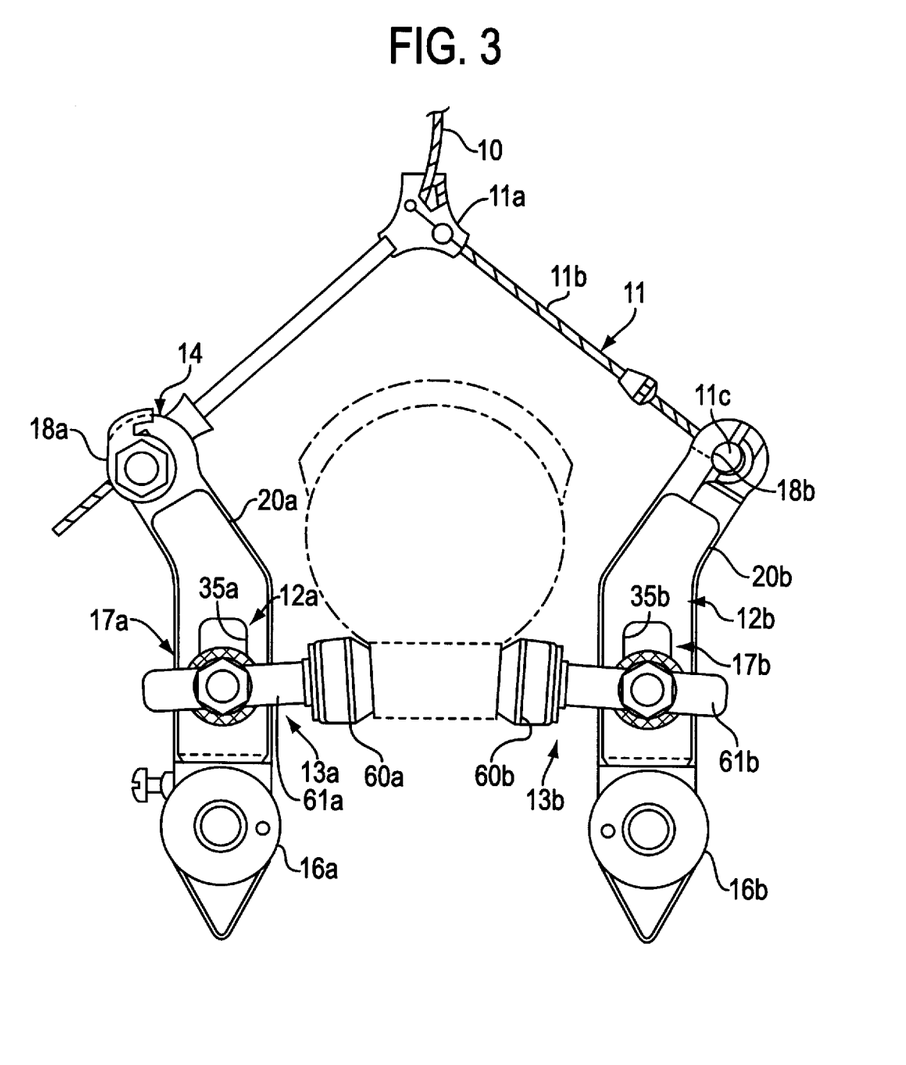
FIG. 3 is a rear view of the brake device shown in FIG. 2.

As shown in FIG. 2 and FIG. 3, the distal end of the inner cable 10, whose basal end is linked to a brake lever 7 provided to the handlebar 6, and the distal end of a branch cable (termed a unit link), which is linked to the inner cable 10 at some point, are linked to the brake device 1. An anchor fitting 14 is screwed onto the distal end of the inner cable 10. The branch cable 11 is provided with a branch fitting 11a which is movably disposed midway down the inner cable 10, a cable 11b whose basal end is secured to the branch fitting 11a by staking, and a cylindrical engagement fitting secured to the distal end of the cable 11b by staking.

The brake device 1 is equipped with a pair of left and right brake links 12a and 12b whose distal ends are detachably linked to the inner cable 10 and the branch cable 11, respectively, and with brake shoes 13a and 13b which are mounted facing each other in an adjustable manner midway down the brake links 12a and 12b. Braking action is provided by bringing brake shoes 13a and 13b into contact with the side surfaces 5a of the rim 5 of the wheel 2.

As shown in FIG. 2 and FIG. 3, the brake links 12a and 12b have plate-shaped link bodies 20a and 20b which bend outward at the top and which have been lightened at the back surfaces. The basal ends of the link bodies 20a and 20b are provided with rotatably supported members 16a and 16b which are rotatably supported on the mounting pins 9a and 9b which project from the pedestals 8a and 8b. The midsections are provided with shoe mounting members 17a and 17b for mounting the brake shoes 13a and 13b. The distal end of the link body 20a is equipped with a first engagement member 18a which detachably engages the anchor fitting 14, and the distal end of the link body 20b is equipped with a second engagement member 18b which detachably engages the engagement fitting 11c.

In the following discussion, description of components that are identical for the left and right brake links 12a and 12b will be described only for the left side (the right side in FIG. 2).

Figure 4:
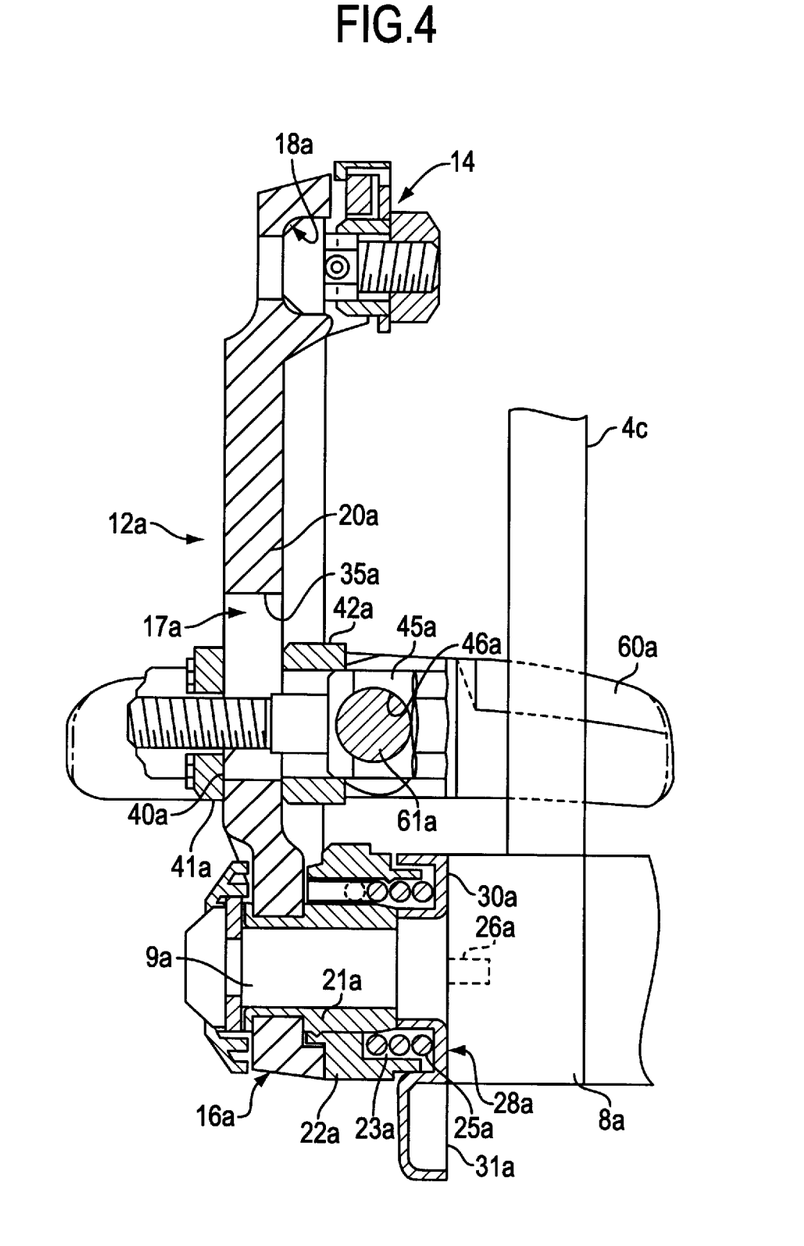
FIG. 4 is a side cross sectional view of a particular embodiment of a brake link assembly according to the present invention.

As shown in FIG. 4, the rotatably supported member 16a is provided with a cylindrical bushing 21a that fits over the mounting pin 9a which has been staked to the basal end of the link body 20a, and with a bottomed cylindrical spring cover 22a that is mounted around the outside surface of the bushing 21a. A cylindrical gap 23a is formed between the spring cover 22a and the bushing 21a. Gap 23a houses a coil spring 25a that energizes the brake link 12a towards the brake release position. As shown in FIG. 5, the back end 26a of the coil spring 25a is engaged by one of the engagement holes 15a, 15b, and 15c that have been made in the pedestal 8a. By varying the engagement position among the engagement holes 15a, 15b, or 15c, it is possible to adjust the strength of the force towards the brake release position between three different levels. The front end of the coil spring (not shown) is engaged by the bottom of the spring cover 22a. The engagement position of the front end of the coil spring 25a on the brake link side 12a can be moved in the circumferential direction of the mounting pin by means of a spring adjustment screw 27 which screws into the outside wall of the spring cover 22a.

A spring cap 28a which covers the back end of the coil spring 25a is rotatably mounted on the back of the spring cover 22a. The spring cap 28a is provided with a cylindrical section 30a which fits over the large-diameter section of the mounting pin 9a, and with a rotation control member 31a of triangular form which projects outward from the peripheral surface of the cylindrical section 30a. The bottom of the spring cover 22a is provided with a through-hole 32a (FIG. 5) through which the back end 26a of the coil spring 25a passes, whereby the coil spring 25a may be engaged.

The provision of a spring cap 28a of this design allows the back end 26a of the coil spring 25a to be set to any desired position simply by rotating the spring cap 28a. Thus, even where the rotation of the brake link 12a is restricted, preventing the back end 26a of the coil spring 25a from being inserted into desired engagement hole 15a–15c in the natural state, the back end 26a can be inserted easily into desired engagement hole 15a–15c simply by rotating the spring cap 28a. The spring cap 28a mounting angle (orientation of the distal end of the spring cap 28a) changes depending on the engagement hole 15a–15c in which the coil spring 25a is engaged, so the engagement position of the coil spring 25a, that is, the strength of the force towards the brake release position, can be readily determined from the orientation of the spring cap 28a. For example, when the coil spring 25a is engaged by the engagement hole 15b, the distal end of spring cap 28a faces downward. When the coil spring 25a is engaged by the engagement hole 15a, the distal end faces diagonally inward. When the coil spring is engaged by the engagement hole 15c, the distal end faces diagonally outward. Thus, the strength of the force towards the brake release position can be readily determined from the orientation of the spring cap 28a.

As shown in FIG. 2 through FIG. 4, the shoe mounting member 17a is provided with a shoe mounting bolt 40a which is inserted from the back end of a slot 35a made in the central section of the link body 20a, a washer 41a which fits over the shoe mounting bolt 40a so as to sandwich the link body 20a, and a collar 42a. The head 45a of the shoe mounting bolt 40a, which is located at the back side of the link body 20a, has a shoe mounting hole 46a which extends in the lateral direction (perpendicular to the plane of the paper in FIG. 4).

As shown in FIG. 3 and FIG. 4, the brake shoe 13a is provided with a rubber shoe body 60a and with a shoe mounting pin 61a which projects outward from the approximate center of the shoe body 60a in the lengthwise direction. The shoe body 60a is thinner than conventional products and does not readily deform during braking. The shoe mounting pin 61a fits through a shoe mounting hole 46a provided in the shoe mounting bolt 40a.

The brake shoe 13a is disposed on the front fork 4 side of the brake link 12a, so the distance from the front fork 4 is shorter, and the moment produced by reaction force from the rim acting on the brake shoe 13a is lower. Thus, a decline in breaking force due to torsion of the fork does not result even when a suspension fork with relatively low torsional rigidity is used. Since the shoe body 60a itself is thin, flexural deformation of the shoe body 60a during braking is minimized, in turn minimizing the decline in braking force.

Figure 6:
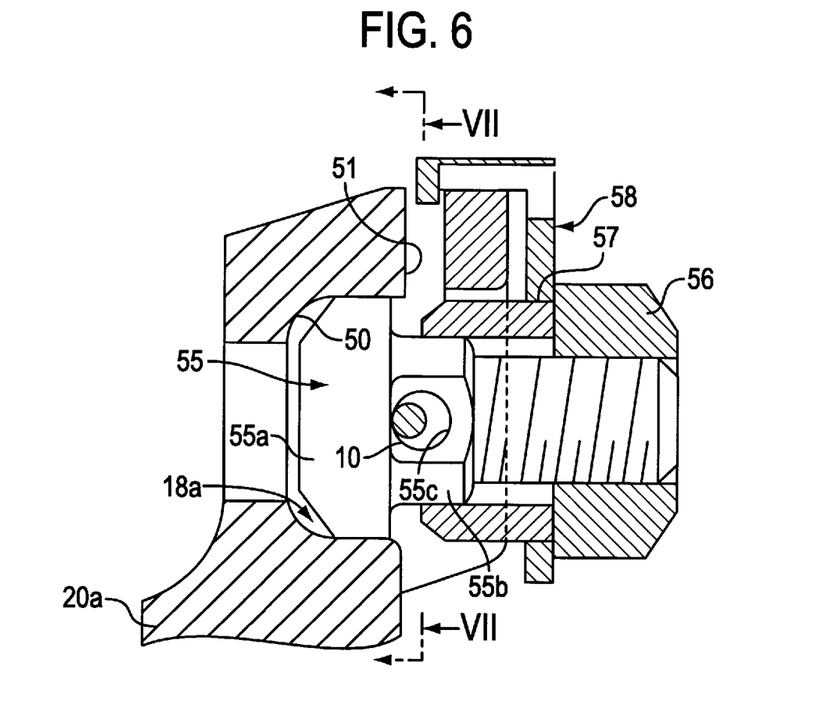
FIG. 6 is a cross sectional view of a particular embodiment of an anchor member according to the present invention.
Figure 7:
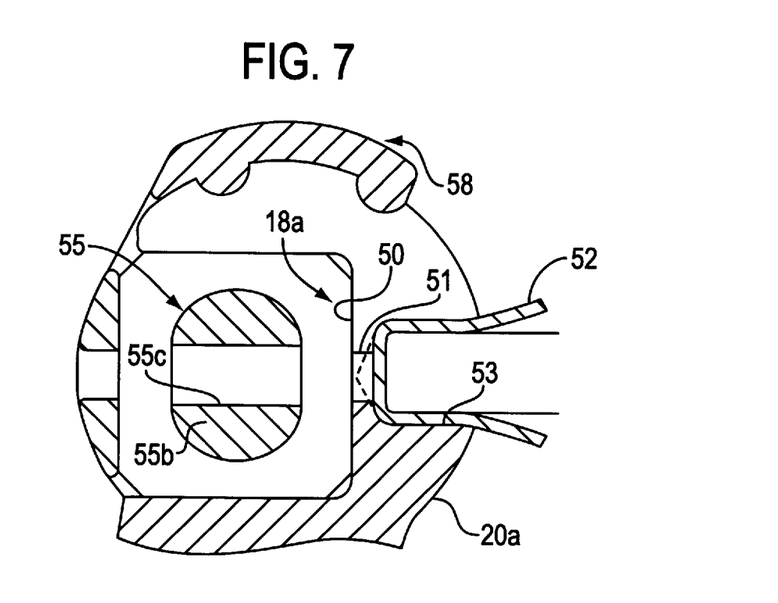
FIG. 7 is a view taken along line VII—VII in FIG. 6.
Figure 8:
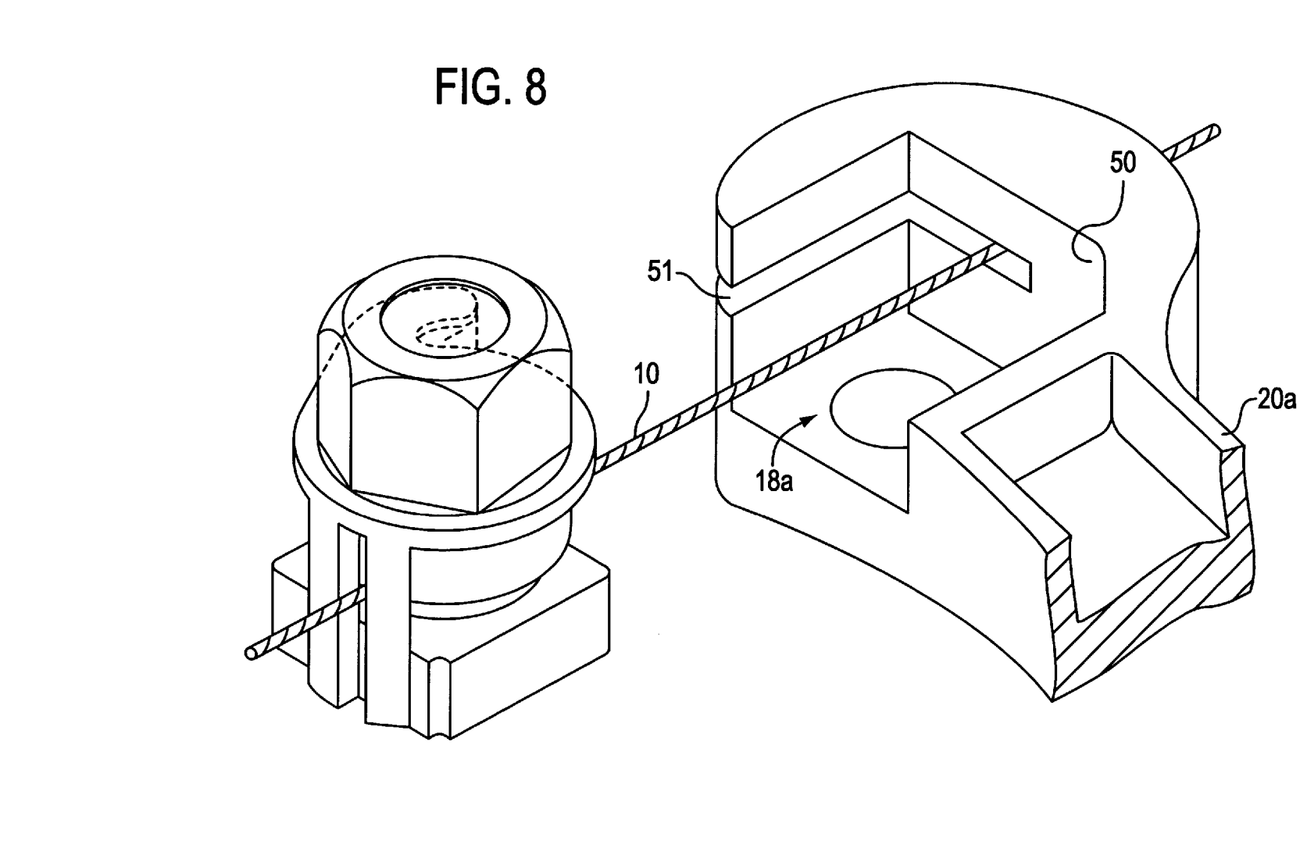
FIG. 8 is a view showing the detachable connection between the anchor member and the brake link.

As shown in FIG. 6 through FIG. 8, the first engagement member 18a has a convex section 50 comprising a square hole formed at the distal end of the link body 20a. The convex section 50 opens laterally outward (as defined in FIGS. 2 and 3) towards the brake release position. A cable groove 51, through which the inner cable 10 is passed, is formed at the distal end of the link body 20a. Cable groove 51 is located further to the inside and above the convex section 50. In this embodiment, the side of the cable groove 51 from which the cable enters is provided with a mounting hole 53 for mounting a protective tube 52 in order to prevent the inner cable 10 from being severed when it is bent.

The anchor fitting 14 is provided with an anchor bolt 55 which is engaged by the convex section 50 in a nonrotatable manner, an anchor nut 56 which screws onto the anchor bolt 55, an anchor collar 57 which fits over the anchor bolt 55, and a detachment prevention member 58 for preventing the anchor fitting 14 from becoming detached from the first engagement member 18a. In this embodiment, the head 55a of the anchor bolt 55 is square so that it may be engaged by the convex section 50 of the first engagement member 18a in a nonrotatable manner. The shaft section of the anchor bolt 55 is double chamfered on the base end, and a cable hole 55c through which the inner cable 10 passes is formed in the direction of the diameter. The anchor collar 57 is a component which presses the inner cable 10 against the cable hole 55c when the anchor nut 56 is tightened in order to anchor the inner cable 10 within the anchor fitting 14.

Figure 9:
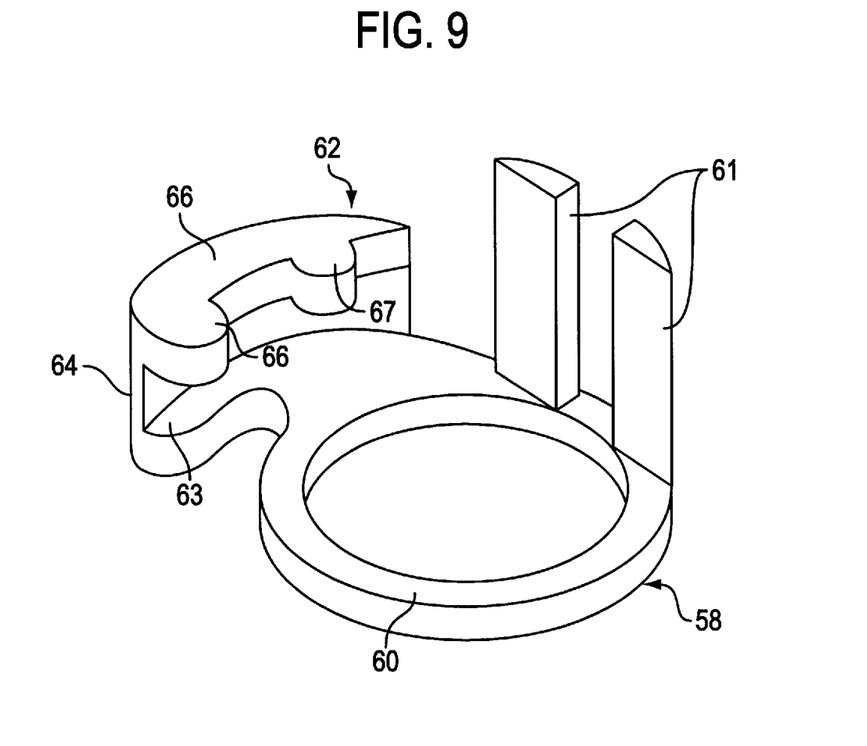
FIG. 9 is a perspective view of a particular embodiment of a detachment preventing member according to the present invention.

The detachment prevention member 58 is a component fabricated from a synthetic resin, and it fits around the exterior of the anchor collar 57. As shown in FIG. 9, detachment prevention member 58 is provided with a ring member 60, a pair of rotation preventing members 61 and 61 which project upward from the ring member 60 in FIG. 9, and an engagement member 62 which projects outward from the ring member 60 and which is engaged by the distal end of the link body 20a. The ring member 60 fits around the outside of the anchor collar 57. When the ring member 60 is fitted around the anchor collar 57, the rotation preventing members 61 and 61 contact the head 55a of the anchor bolt 55 and prevent the detachment prevention member 58 from rotating. The engagement member 62 is provided with a projecting member 63 which projects outward from the ring member 60 in a tangential direction, a clip member 65, disposed at the distal end of the projecting member 63 and provided with a pair of tongue members 66 and 67 disposed at intervals along its inside edge, and a connecting member 64 which connects the projecting member 63 and the clip member 65. When the detachment prevention member 58 has been fitted around the anchor collar 57, its engagement member 62 fits over the link body 20a to the rear of the cable groove 51 so that the anchor fitting 14 is prevented from becoming detached from the first engagement member 18a even when the inner cable 10 is not tensed. Since the anchor fitting 14 is detachable from the first engagement member 18a, the brake link 12a can be opened reliably with being affected by the inner cable 10, even in a unit link design.

When brake adjustment is to be performed on a brake device 1 constituted in this way, the anchor nut 56 of the anchor fitting 14 is loosened, releasing the end of the anchored inner cable 10. Holding the brake link 12a in the proper position, the anchor nut 56 is turned to perform brake adjustment. Since the anchor bolt 55 is prevented from turning, it is unnecessary to hold the anchor bolt 55 using a tool. Thus, brake adjustment can be performed easily by one person, and the gaps between the rim and the brake shoes can be appropriately maintained. Of course, where the bicycle manufacturer has set the anchor position of the anchor fitting 14 with respect to the inner cable 10 at the factory, optimal brake adjustment can be accomplished subsequently simply by anchoring the anchor fitting 14 in this position.

When the wheel 2 is to be attached or detached, the brake links 12a and 12b are held closed while disengaging the anchor fitting 14 from the first engagement member 18a of the brake link 12a and disengaging the engagement fitting 11c from the second engagement member 18b of the brake link 12b. As a result, the two brake links 12a and 12b are energized towards the brake release position (laterally outward) by the coil springs 25a and 25b. The brake shoes 13a and 13b open until the shoe bodies 60a and 60b come into contact with the stabilizer 4c. Since the brake line 12a on the side to which the inner cable 10 is linked opens reliably, the front wheel 2 can be attached or detached with ease.

When installing the brake device on the mounting pins 9a and 9b, the rotatably supported members 16a and 16b are mounted onto the mounting pins 9a and 9b, and the rotation control member 31 is grasped with the fingers to position the back ends 26a and 26b of the coil springs 25a and 25b into any one of the desired engagement holes 15a–15c. In this state, pushing the rotatably supported members 16a and 16b further back causes the back ends 26a and 26b to enter the selected engagement hole 15a–15c.

Since the brake shoes 13a and 13b are disposed on the front fork 4 side of the brake links 12a and 12b in order to maintain strong braking force, the back edges of the shoe bodies 60a and 60b come into contact with the stabilizer 4c, thereby restricting rotation of the brake links 12a and 12b towards the brake release position. However, since the engagement positions of the back ends 26a and 26b of the coil springs 25a and 25b can be freely changed using the rotation control members 31a and 31b, the ends of the coil springs 25a and 25b can be reliably inserted into the desired engagement holes 15a–15c even where the rotation of the brake links 12a and 12b is restricted.

Figure 10:
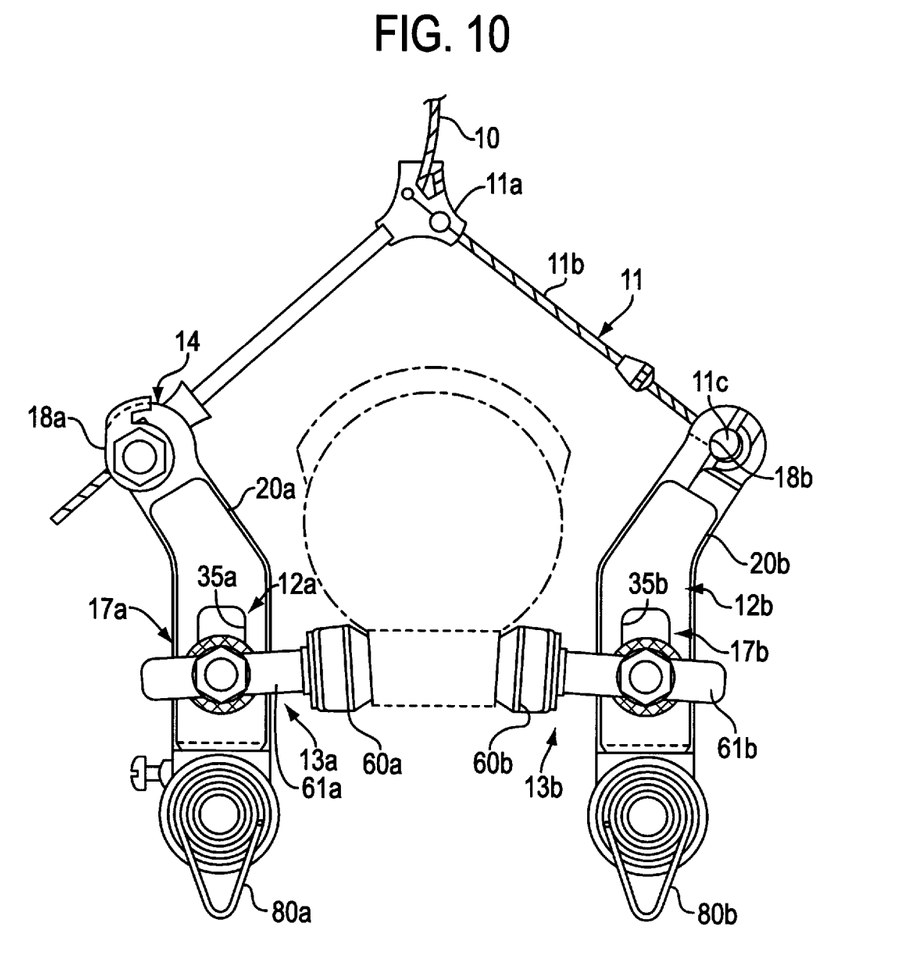
FIG. 10 is a rear view of an alternative embodiment of a cantilever brake device according to the present invention.
Figure 11:
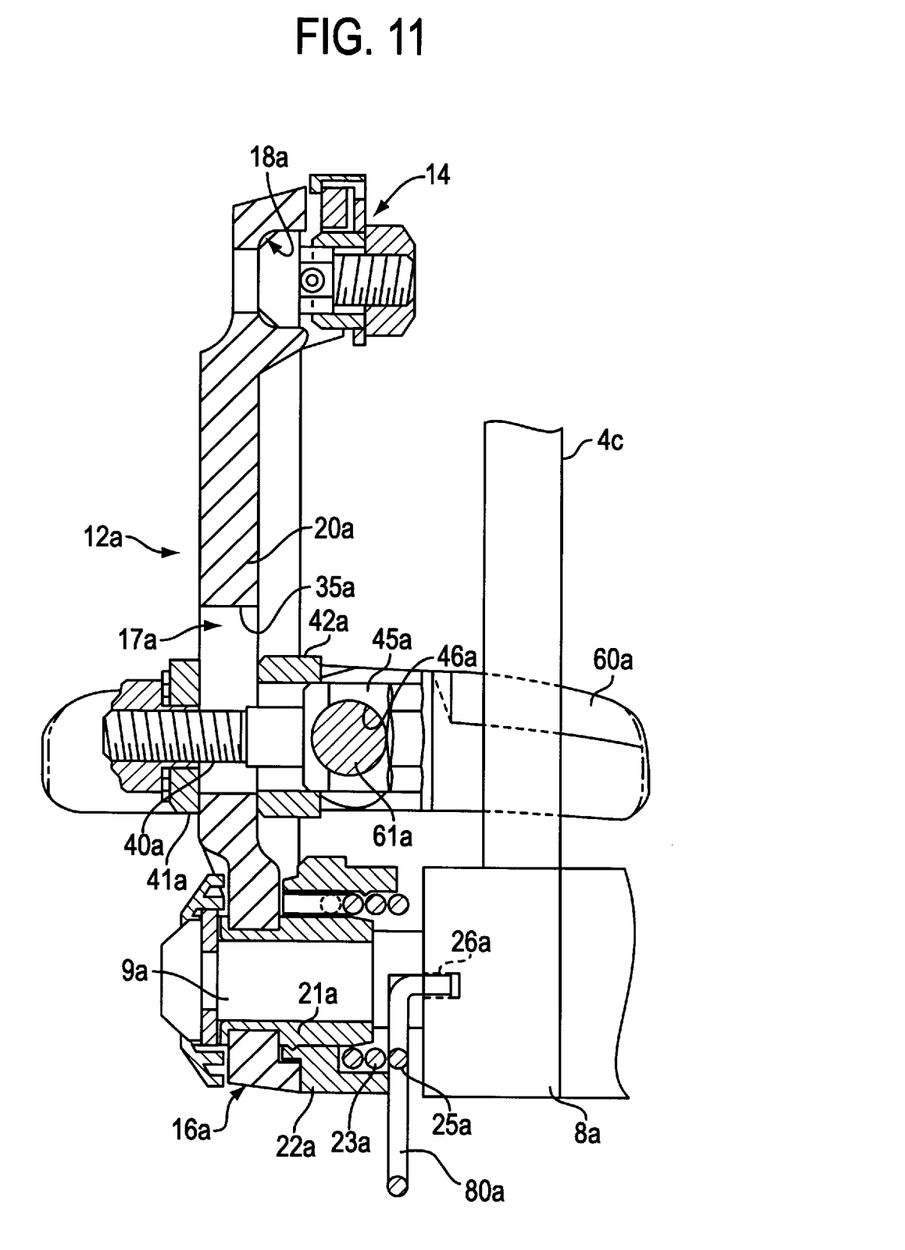
FIG. 11 is a side cross sectional view of a brake link assembly shown in FIG. 10.

While the above is a description of various embodiments of the present invention, further modifications may be employed without departing from the spirit and scope of the present invention. For example, the present invention may be implemented in the rear brake instead of the front brake. Also, as shown in FIGS. 10–11, spring caps 28a and 28b may be omitted, and rotation control members 31a and 31b may be replaced by radially bent portions 80a and 80b of springs 25a and 25b, respectively, which protrude outwardly from the spring diameter. Radially bent portions 80a and 80b may be formed as triangular sections to facilitate gripping in the same manner as rotation control members 31a and 31b, and spring ends 26a and 26b may extend directly from radially bent portions 80a and 80b so that movement of radially bent portions 80a and 80b cause a corresponding direct movement of spring ends 26a and 26b.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A cantilever brake arm apparatus comprising:
    a brake link (12a) including:
        a basal end (16a) structured for rotatably supporting the brake link (12a) on a bicycle;
        an intermediate section (17a) structured for supporting a brake shoe (13a); and
        a distal end (18a);
    a coil spring (25a) having a first end and a second end (26a), wherein the first end is retained to the basal end (16a); and
    a spring position adjusting member (28a, 80a) having a side surface and a radially inwardly extending bottom surface, wherein the coil spring (25a) is disposed between the brake link (12a) and the bottom surface, wherein the second end (26a) of the coil spring (25a) is retained to the bottom surface, wherein the spring adjusting member (28a, 80a) is rotatably supported relative to the basal end (16a) so that rotation of the spring adjusting member moves the second end (26a) of the coil spring (25a); and
    wherein the second end (26a) of the coil spring (25a) extends beyond the spring position adjusting member (28a, 80a).

2. The apparatus according to claim 1 wherein the spring position adjusting member (28a) includes a rotation control member (31a) extending from an outer surface thereof.

3. The apparatus according to claim 1 wherein the spring position adjusting member (28a) comprises a cylindrical section (30a) forming the side surface, wherein an opening (32a) is disposed in the bottom surface for receiving the second end (26a) of the coil spring (25a) therethrough.

4. The apparatus according to claim 3 wherein the spring position adjusting member (28a) includes a rotation control member (31a) extending radially outwardly therefrom.

5. The apparatus according to claim 4 wherein the rotation control member (31a) has a triangular shape.

6. The apparatus according to claim 1 further comprising a brake shoe (13a) mounted to the intermediate section (17a).

7. The apparatus according to claim 6 wherein the brake shoe (13a) comprises:
   an elastic shoe body (60a); and
   a shoe mounting member (61a) extending from approximately a longitudinal center of the shoe body (60a).

8. The apparatus according to claim 7 wherein the shoe mounting member (61a) mounts the shoe body (60a) to a side of the intermediate section (17a) where the second end (26a) of the coil spring (25a) is located.

9. The apparatus according to claim 1 wherein the spring position adjusting member (80a) comprises a radially outwardly bent portion of the coil spring (25a).

10. A cantilever brake arm apparatus mounted to a bicycle fork (4c) comprising:
   a pedestal (8a) extending from the fork (4c), wherein the pedestal includes a plurality of first openings (15a, 15b, 15c);
   a brake link (12a) including:
      a basal end (16a) structured for rotatably supporting the brake link (12a) on the pedestal (8a);
      an intermediate section (17a) structured for supporting a brake shoe (13a); and
      a distal end (18a);
   a coil spring (25a) having a first end and a second end (26a), wherein the coil spring (25a) is mounted around the pedestal (8a), and wherein the first end is retained to the basal end (16a); and
   a spring position adjusting member (28a, 80a) having a portion which retains the second end (26a) of the coil spring (25a), wherein the spring adjusting member (28a, 80a) is rotatably supported around the pedestal (8a) for rotation relative to the basal end (16a); and
   wherein the second end (26a) of the coil spring (25a) extends into one of the plurality of first openings (15a, 15b, 15c).

11. The apparatus according to claim 10 wherein the spring position adjusting member (28a) includes a rotation control member (31a) extending from an outer surface thereof.

12. The apparatus according to claim 10 wherein the spring position adjusting member (28a) comprises a cylindrical section (30a) having a radially inwardly extending bottom surface, wherein a second opening (32a) is disposed in the bottom surface for receiving the second end (26a) of the coil spring (25a) therethrough so that rotation of the spring adjusting member moves the second end (26a) of the coil spring (25a).

13. The apparatus according to claim 12 wherein the spring position adjusting member (28a) includes a rotation control member (31a) extending radially outwardly therefrom.

14. The apparatus according to claim 13 wherein the rotation control member (31a) has a triangular shape.

15. The apparatus according to claim 10 further comprising a brake shoe (13a) mounted to the intermediate section (17a).

16. The apparatus according to claim 15 wherein the brake shoe (13a) comprises:
   an elastic shoe body (60a); and
   a shoe mounting member (61a) extending from approximately a longitudinal center of the shoe body (60a).

17. The apparatus according to claim 16 wherein the shoe mounting member (61a) mounts the shoe body (60a) to a side of the intermediate section (17a) where the second end (26a) of the coil spring (25a) is located.

18. The apparatus according to claim 10 wherein the spring position adjusting member (80a) comprises a radially outwardly bent portion of the coil spring (25a).

* * * * *